United States Patent [19]

Phelps et al.

[11] Patent Number: 4,901,795

[45] Date of Patent: * Feb. 20, 1990

[54] METHOD FOR IMPARTING SELECTIVITY TO OTHERWISE NONSELECTIVE POLYMER CONTROL GELS

[75] Inventors: Craig H. Phelps, Carrollton; E. Thomas Strom, Dallas, both of Tex.; Dennis H. Hoskin, Lawrenceville, N.J.; Thomas O. Mitchell, Pennington, N.J.; Paul Shu, West Windsor, N.J.

[73] Assignee: Mobil Oil Corporation, New York, N.Y.

[*] Notice: The portion of the term of this patent subsequent to Aug. 15, 2006 has been disclaimed.

[21] Appl. No.: 284,626

[22] Filed: Dec. 25, 1988

Related U.S. Application Data

[63] Continuation-in-part of Ser. No. 917,324, Oct. 9, 1986, Pat. No. 4,834,180.

[51] Int. Cl.$^4$ .................... E21B 33/138; E21B 43/22; E21B 43/24
[52] U.S. Cl. .................................. 166/270; 166/272; 166/274; 166/295; 166/300; 523/130
[58] Field of Search ............... 166/270, 272, 274, 294, 166/295, 300; 405/264; 523/130, 132

[56] References Cited

U.S. PATENT DOCUMENTS

| | | | |
|---|---|---|---|
| 3,557,562 | 1/1971 | McLaughlin, Jr. et al. | 61/41 |
| 3,918,521 | 11/1975 | Snavely et al. | 166/272 |
| 4,069,869 | 1/1978 | Sandiford | 166/294 X |
| 4,157,322 | 1/1979 | Colegrove | 166/300 X |
| 4,309,523 | 1/1982 | Engelhardt et al. | 526/240 |
| 4,461,351 | 7/1984 | Falk | 166/295 |
| 4,479,894 | 10/1984 | Shen et al. | 252/8.55 D |
| 4,489,783 | 12/1984 | Shu | 166/272 |
| 4,513,821 | 4/1985 | Shu | 166/273 |
| 4,565,249 | 1/1986 | Pebdani et al. | 166/303 |
| 4,606,407 | 8/1986 | Shu | 166/275 X |
| 4,644,020 | 2/1987 | Stahl | 522/79 |
| 4,706,754 | 11/1987 | Smith | 166/300 X |
| 4,716,966 | 1/1988 | Shu | 166/294 X |
| 4,750,562 | 6/1988 | Jennings, Jr. | 166/308 X |
| 4,782,901 | 11/1988 | Phelps et al. | 166/270 |
| 4,793,416 | 12/1988 | Mitchell | 166/270 X |

*Primary Examiner*—George A. Suchfield
*Attorney, Agent, or Firm*—Alexander J. McKillop; Charles J. Speciale; Charles A. Malone

[57] ABSTRACT

A method for selectively closing pores in a formation's zone of greater permeability. A rehealable Xanthan or Alcaligenes biopolymer in an aqueous medium is combined with an organic or transition metal cross-linker which forms a first stage selective ex-situ gel. Second stage non-selective gel precursors are also included. The second stage gel comprises a polymer cross-linked with organic cross-linkers so as to form an in-situ gel more able to withstand formation conditions. The combination is injected into a formation after the first stage gel forms where it selectively enters a zone of greater permeability carrying therewith said non-selective gel. Once in the formation's zone of greater permeability, the gel reheals and forms a rigid gel having the desirable characteristics of the non-selective gel.

23 Claims, No Drawings

METHOD FOR IMPARTING SELECTIVITY TO OTHERWISE NONSELECTIVE POLYMER CONTROL GELS

RELATED APPLICATIONS

This application is a continuation-in-part of copending application Ser. No. 917,324, now U.S. Pat. No. 4,834,180 filed Oct. 9, 1986. This application is related to application Ser. No. 201,230, now U.S. Pat. No. 4,856,586 filed June 2, 1988.

FIELD OF THE INVENTION

This invention relates to the use of gels for profile control so that increased amounts of hydrocarbonaceous fluids can be obtained from a lesser permeability zone in a formation.

BACKGROUND OF THE INVENTION

In the recovery of oil from oil-containing formations, it is usually possible to recover only minor portions of the original oil-in-place by so-called primary recovery methods which utilize only natural forces. To increase the recovery of oil a variety of supplementary recovery techniques are employed. These techniques include waterflooding, miscible flooding, and thermal recovery.

A problem that arises in various flooding processes is that different strata or zones in the reservoir often possess different permeabilities. Thus, displacing fluids enter high permeability or "thief" zones in preference to zones of lower permeability. Significant quantities of oil may be left in zones of lower permeability. To circumvent this difficulty the technique of profile control is applied to plug the high permeability zones with polymeric gels and thus divert the displacing fluid into the low permeability, oil rich zones. Among the polymers examined for improving waterflood conformance are metal cross-linked polysaccharides, metal cross-linked polyacrylamides, and organic cross-linked polyacrylamides.

Basic to the problem of diverting displacing fluid with polymeric gels is the necessity of placing the polymer where it is needed, i.e. selective penetration into the high permeability zone. This is possible in the case of Cr cross-linked xanthan gel formed above ground. Xanthan biopolymers may be cross-linked with metal ions such as $Cr^{+3}$ above ground to give gels. These gels are shear stable and thinning and can be injected into the formation where they then reheal. Due to the unique rheological property of such a gel, it prefers to go into high permeability zones. However, Xanthan-Cr gels have poor thermal stability at temperatures greater than about 140° F. There are also many other gels systems that are formed in-situ. One system disclosed in U.S. Pat. No. 3,557,562 contains acrylamide monomer, methylene-bis-acrylamide as an organic cross-linker, and a free radical initiator. This system undergoes polymerization in the formation to give a polyacrylamide cross-linked with methylene-bis-acrylamide. However, the viscosity of the solution when injected is like that of water. Unless mechanical isolation is used, these solutions are quite capable of penetrating low permeability, oil bearing zones. Another form of in-situ gelation involves the injection of polyacrylamide containing chromium in the form of chromate. A reducing agent such as thiourea or sodium thiosulfate is also injected to reduce the chromate in-situ to $Cr^{+3}$, a species capable of cross-linking hydrolyzed polyacrylamide. Even though the polyacrylamide solution has a viscosity greater than water, it is not capable of showing the selectivity that a gel can. Thus, polyacrylamides cross-linked with chromium in-situ can also go into low permeability zones. It is not useful to cross-link polyacrylamides above ground and inject them as gels, because polyacrylamide gels undergo shear degradation.

Therefore, what is needed is a method where a selective ex-situ gel composition can be combined with an in-situ gel composition so as to obtain greater selectivity in closing a zone of greater permeability in a formation while forming a gel having substantially better qualities to withstand formation conditions.

SUMMARY

This invention is directed to a method for sequential gellation into a formation having varying permeabilities. In the practice of this invention, a first gel is placed into an aqueous solution in an amount sufficient to enter pores in a formation's zone of greater permeability. This gel forms ex-situ and is shear thinning. A second in-situ gel is combined with said first gel. Said second gel is substantially more resistant to formation conditions than the first gel.

After mixing, the gelled ex-situ gel containing ungelled in-situ gel components is directed into the formation's zone of greater permeability by the selective penetration of the ex-situ gel. Here it reheals. Thereafter, heat from the formation causes the in-situ gel to firm and form a solid gel which is substantially more resistant to formation conditions than said first gel.

It is therefore an object of this invention to make a gel system where one gel can selectively enter a high permeability zone and reheal while transporting a substantially thinner non-selective gel into said high permeability zone.

It is another object of this invention to keep a thinner in-situ gel from entering a zone of lesser permeability.

It is yet another object of this invention to place non-selective gel components into a formation's zone of greater permeability where they can form in-situ a gel substantially more resistant to formation conditions.

It is still another object of this invention to place a non-selective gel into a high permeability zone without utilization of mechanical isolation.

It is yet still a further object of this invention to place a polymer to be cross-linked with an aminoplast resin into a high permeability zone where it can form a gel in-situ while avoiding the polymer's entry into a low permeability zone.

It is yet still a further object of this invention to deliver a gel system into a more permeable zone of a formation while avoiding separation and dilution of the gel precursor components.

BRIEF DESCRIPTION OF THE PREFERRED EMBODIMENTS

By the inclusion of an ex-situ and an in-situ gel into one system the non selective in-situ gel can be selectively delivered into a target zone with the sequential gelation process. In the preparation of this system two functionally different gels are utilized. One gel is utilized to obtain selectivity so that the combined gel system can enter zones of greater permeability in a formation. Another gel is used to obtain increased rigidity and better temperature stability. Utilization of the combined system allows it in one sequence to enter a more permeable zone of the formation. In another sequence, the combined system propagates a desired distance into a formation. Once the system has propagated to the desired distance into the formation, it forms a rigid gel having substantially better temperature stability and increased rigidity.

In one embodiment of this invention, biopolymer gels are utilized for formation selectivity, and an aminoplast resin cross-linked polymer gel is utilized for rigidity and increased thermal stability. Preferred biopolymers for utilization herein are a Xanthan biopolymer which is obtainable from Pfizer Co. and Kelco's S-130 biopolymer derived from Alcaligenes microbe. The trademarked Xanthan product is marketed as Flocon 4800C. The non-selective polymer preferred for utilization is one having at least one functional group selected from a member of the group consisting of an amine, an amide, a hydroxyl, or a thiol. An aminoplast resin utilized should contain a methylol group and its alkylated varieties which are reactive to said polymer. Said methylol group and its alkylated varieties on said resin can condense to form a cured resin.

A typical formulation of Xanthan biopolymer consists of 2000 ppm Flocon 4800C, 100 ppm NaOH, and 80 ppm $Cr^{+3}$. This formulation forms a gel in about four hours, although gelation starts soon after addition of $Cr^{+3}$. The four hour gel is capable of being injected into a formation because it is shear thinning and rehealing. If the gel is not preformed prior to injection, it can block low permeability regions which have not been fully swept by a drive fluid. Should this occur, decreased fluid drive injectivity would occur which would reduce oil recovery. The Xanthan-Cr gel is reasonably firm with a consistency like that of agar or gelatin. Due to gel instability at higher temperatures, the useful temperature limit for Xanthan-Cr gels is about 140°–150° F.

Kelco S-130 can be used to prepare a more thermally stable selective gel. A typical formulation consists of about 2,000 to about 5,000 ppm of S-130, and about 1,000 to about 4,000 ppm of a melamine formaldehyde resin. In order to make a quicker preshear gel, the pH should be about 3.5. A selective gel can be formed at higher pH's when Flocon polymer is combined with S-130 along with $Cr^{+3}$ in a concentration of from about 80 to about 200 ppm. Resorcinol and formaldehyde can also be included.

Generally, it is not preferred to use high $Cr^{+3}$ concentrations in the selective gel during $CO_2$ flooding because syneresis may increase at a low pH. A low pH, melamine cross-linked selective gels are preferred; such gels are formed more quickly ex-situ at low pH. Once the gel has been sheared upon entering a more permeable zone of a formation, the pH can be higher. Rehealing however would be slower. As an example, the first stage gel could be injected into a reservoir that has a pH of about 7. Alternatively, the pH could be adjusted to a higher pH if delayed rehealing were desired.

The melamine formaldehyde ("MF") resin utilized herein is formed as a reaction product of melamine and formaldehyde. Said resin is known as an aminoplast or amino resin which comprises a class of thermo-setting resins made by the reaction of an amine with an aldehyde. The resultant resin is reacted with a cross-linkable polymer in an aqueous medium under substantially all pH conditions and needs no catalyst. Said polymer has at least one functional group selected from a member of the group consisting of an amine, an amide, a hydroxyl, or a thiol group. This reaction can be carried out at ambient conditions, and also under conditions occurring in a subterranean hydrocarbonaceous formation. The gel resultant from said reaction can be used in the recovery of hydrocarbonaceous fluids from a formation containing same.

The non-selective gels are unaffected by high saline concentrations often encountered in oil reservoirs. High temperatures encountered in said reservoirs do not adversely affect said gels. Carbonate, bicarbonate, and sulfate anions encountered in oil reservoirs which are known to affect certain metal cross-linked gels do not affect these novel gels. These gels can be formed under all pH conditions and are particularly useful in pH conditions of 10 or less. A method for making a kindred gel is discussed in U.S. Pat. No. 4,157,322 which issued to Colegrove on June 5, 1979. Unlike Colegrove, the instant gelation reaction is not catalyzed by a salt which is acid generating upon the application of heat. This patent is hereby incorporated by reference. Polymerization retarders can be added to delay gelation so that the non-selective polymer can penetrate the formation to the desired distance. The gel when formed is extremely rigid and undergoes substantially no syneresis. With the incorporation of a commercially available stabilizer the gels are stable to about 200° F. This non-selective gel is useful in a reservoir having a temperature above 140° F. where conventional Xanthan gels are not recommended. However, the gel precurser system will show no selectivity in the absence of an ex-situ gel.

Non-selective gels can be made from polymers having functional groups such as $NH_2$, $-CONH_2$, $-OH$, and SH. These polymers can be gelled with methylated MF resins. Some acceptable polymers include polyacrylamide, acrylamide modified polyvinyl alcohol ("AMPVA"), poly (acrylamide-co-acrylamido-2-methyl-propanesulfonate) "AM-AMPS", Halliburton K-Trol polymer, "Phillips HE" or Hoechst polymers (families of acrylamide containing copolymers), and polyvinyl alcohol. More specifically, Phillips HE polymer comprises copolymers of N-vinyl-2-pyrrolidone (VP) and acrylamide (Am) in which the weight ratios of VP:Am preferably range from about 30:70 to about 70:30. Copolymers of VP and Am are discussed in U.S. Pat. No. 4,644,020 which is assigned to Phillips Petroleum Company. This patent is hereby incorporated herein in its entirety.

Halliburton's K-Trol polymer is discussed in SPE/DOE paper 14958 which was presented at the Fifth SPE/DOE EOR Symposium at Tulsa, Oklahoma on Apr. 20-23, 1988. This paper was entitled "In-Situ Polymerization Controls $CO_2$/Water Channeling at Lick Creek". It was authored by P. Woods et al. Halliburton's K-Trol polymer is comprised of polyacrylamide cross-linked with methylene-bis-acrylamide. Hoechst 2825 and 3140 polymers are also polyacrylamides in which functional groups are incorporated during synthesis. These functional groups can be cross-linked with organic or transitional metal cross-linkers. The composition of Hoechst polymers is discussed in U.S. Pat. No. 4,309,523 which is hereby incorporated by reference herein. Hoechst polymers comprise 2-acrylamido-2-methyl-propane-3-sulphonic acid (AMPS), vinylacylamide, and acrylamide. Experiments conducted with all of the above polymers indicate that they contain at least one of the functional groups, i.e., $NH_2$, $-CONH_2$, $-OH$, or $-SH$ which cross-link with organic and transitional metal cross-linkers mentioned herein to form a gel.

Polymers mentioned in U.S. Pat. No. 4,157,322, supra, may be utilized as long as those polymers contain the functional groups above mentioned. Polymer concentration in said gels range from about 0.1 to about 5.0 wt. percent. These polymer concentrations vary depending upon the molecular weight of polymer used. Lower molecular weight polymers require a higher polymer concentration to gel. A polymer concentration of about 0.2–5.0 wt. percent is preferred. This cross-linking/co-gelation method produces high integrity polymer gels able to withstand high temperatures and high salinity conditions often found in subterranean hydrocarbonaceous formations.

Methylated MF derived as a reaction product of melamine and formaldehyde has a molar ratio of between 1–6. A ratio of 3–6 is commonly found in commercial resins. The methylol group, $-CH_2OH$ and its methylated varieties are reactive to various functional groups such as $NH_2$, $-CONH_2$, $-OH$, $-SH$ and can also self-condense to form cured resins. Its preparation is convenient and well documented in preparative polymer manuals.

The melamine resin that is utilized in this invention can be a commercial product such as Cyanamid's Parez® resins. Included among these melamine-formaldehyde (melamine) resins which are useful in this invention are the partially methylated resins and the hexamethoxymethyl resins (i.e. American Cyanamid's Parez, Cymel™ 373, Cymel 370, Cymel 303, and Cymel 380). The resin, however, has to be one that is soluble or dispersible in an aqueous medium. Other amino resins can also be used. Non-limiting examples are urea-formaldehyde, ethylene and propylene urea formaldehyde, triazone, uron, and glyoxal resins. The amount of MF resins required for adequate gel formation is in the ratio of 10:1–1:10 polymer to amino resins. Preferred polymer concentrations are from about 0.2 to about 5.0 wt. percent. Amino resins are preferred cross-linkers because they (1) are economical to use; (2) can be applied to a wide variety of polymers; (3) form thermally stable, brine tolerant gels; and (4) do not need an acid or base catalyst. Phenolic resins can also be used.

The gelation rate of the composition depends on the amount of each of the components, the pH, and the temperature at which the reaction is conducted. Thus, one can tailor the gel rate and gel strength of the composition by adjusting the amount of the polymer, the resin amount, the pH, and the temperature. Higher temperatures at given concentrations of resin and polymer will result in a faster gelation time. If a thicker gelled composition is desired, the polymer and resin concentrations may be increased for a given temperature.

Non-selective gels resultant from the gelation reaction can be formed in about a 15 to 30 wt. % brine solution containing at least about 1500 ppm Ca(II) and at least about 500 ppm Mg(II). Said formed gels were stable as determined by sustained gel integrity and low gel shrinkage at a temperature of at least about 195° F. for at least three months. Examples of preferred non-selective gel compositions are set forth below.

TABLE 1

Examples of Non-Selective Gels
Gelation with Melamine-Formaldehyde Cross-linker

| Example | Polymer | 30% Brine[8] | Deionized Water | Parez 613[1] |
|---|---|---|---|---|
| | 10% AMPVA[2] | | | |
| #1 | 5 g | 5 g | 0 | 0.4 g |
| #2 | 2.5 g | 5 g | 2.5 g | 0.4 g |
| | AMPSR-AMPVA[3] 10% | | | |
| #3 | 2.5 g | 5 g | 2.5 g | 0.4 g |
| #4 | 5 g | 5 g | 0 | 0.4 g |
| | PVA[4] 5% | | | |
| #5 | 5 g | 2.5 g | 2.5 g | 0.4 g |
| | AMPS-PVA[5] 10% | | | |
| #6 | 5 g | 2.5 g | 2.5 g | 0.4 g |
| | Magnifloc[6] 1% | | | |
| #7 | 5 g | 5 g | 0 | 0.4 g |
| #8 | 5 g | 2.5 g | 2.5 g | 0.4 g |
| | AM-AMPS[7] 1% | | | |
| #9 | 5 g | 5 g | 0 | 0.4 g |
| #10 | 2.5 g | 5 g | 2.5 g | 0.4 g |

Gelation with Trimethylolmelamine (TM)

| Example | Polymer | 30% Brine[8] | Deionized Water | TM |
|---|---|---|---|---|
| | HE B 2%[9] | | | |
| #11 | 2.5 g | 5 g | 2.5 g | 0.4 g |
| #12 | 2.5 g | 5 g | 2.5 g | 0.4 g |
| | HE E 2% | | | |
| #13 | 2.5 g | 5 g | 2.5 g | 0.4 g |
| #14 | 2.5 g | 5 g | 2.5 g | 0.2 g |

[1] A commercial 80% active amino resin obtainable from American Cyanamid
[2] Acrylamide modified polyvinyl alcohol
[3] Acrylamido-2-methyl-propanesulfonate/acrylamide modified polyvinyl alcohol
[4] Polyvinyl alcohol
[5] Acrylamido-2-methyl-propanesulfonate/polyvinyl alcohol
[6] Polyacrylamide obtained from American Cyanamid
[7] Poly (acrylamide-co-acrylamido-2-methyl-propanesulfonate)
[8] 30% NaCl, 2000 ppm Ca, 1000 ppm Mg
[9] Phillips HE When utilized in the field for profile control purposes, the gelation rate of a system will depend on the amount of the components and the temperature at which the reaction is conducted. Thus, one can tailor the gel rate and the gel strength of the system by adjusting the amount of polymer, the cross-linker, the initiator, the polymerization retarder, pH, and temperature. The higher the temperature at given concentrations of cross-linker and polymer, the faster the gelation time. If a thicker gelled composition is desired, the polymer and cross-linker concentrations may be increased for a given temperature.

In preparing the gel system for utilization herein, the aqueous solution can comprise fresh water, brackish water, sea water, produced formation waters and mixtures thereof. A brine solution comprising sodium chloride in about 1 wt. % to 20 wt. %, preferably about 7.0 wt. % can be utilized. Xanthan biopolymer can be used in an amount of from about 1000 to about 5000 ppm. Chromic ions utilized should be from about 30 to about 300 ppm. Other polyvalent metal ions which can be utilized include aluminum, boron and iron. Alkali metal hydroxides which can be utilized include sodium and potassium hydroxide. Sodium hydroxide is preferred. The amount of alkali or alkaline earth metal hydroxide utilized should be from about 10 to about 1000 ppm, preferably about 100 ppm. A method for making a xanthan gel cross-linked with transitional metal ions, and an alkali or alkaline earth metal hydroxide is disclosed in U.S. Pat. No. 4,782,901 which issued to Phelps et al. on Nov. 8, 1988. This patent is incorporated by reference herein. The non-selective gel can be comprised of polymer concentrations of from about 0.2 to about 5.0 wt. percent of the above mentioned cross-linkable polymer having the designated functional group. The partially methylated aminoplast resin which cross links with the polymer should be in an amount of from about 0.02 to about 50.0 wt. percent.

As examples, selective gel is made from a mixture consisting of 2000 ppm Flocon 4800C (commercial Xanthan biopolymer), 100 ppm NaOH, and 80 ppm $Cr^{+3}$ in 7% brine and allowed to stand at room temperature. This gel will form in about four hours with the typical consistency of a Flocon 4800C gel, firm but not rigid, syneresing over time. While this mixture is in its ungelled state, a polymer and a cross-linker selected from one of the compositions in Table 1 is added thereto.

In addition to the selective gel made from $Cr^{+3}$ cross-linked Xanthan biopolymer, a selective gel can be made from Kelco S-130 Alcaligenes derived biopolymer. This biopolymer can be used alone to make a selective gel at high salinities or it can be used, optionally, in combination with a Xanthan biopolymer, with organic cross-linkers. Some possible combinations appear in Table II.

Table II shows examples supporting the additional use of Parez 613 resin to form first stage selective gels. All experiments were run in deionized water; pH was adjusted with 0.1N HCl or NaOH. Since shear thinning and subsequent gel rehealing was observed each time it was tried (with the systems reported), in some experiments designed to explore first stage gel formation, the rehealing portion of the experiment was not run. The results are given in the accompanying table, which includes for comparison some experiments in which no first stage selective gel formed.

TABLE II

| | EXAMPLES OF SELECTIVE GELS | | | |
|---|---|---|---|---|
| Run | Composition (ppm Component) | pH | Preshear Gel Time | Reheal Temp °F. |
| T621 | 1000 Flocon<br>4000 S—130<br>25 Cr<br>4000 Parez 613 | 6.5 | (no gel) | — |
| T622 | 2000 Flocon<br>3000 S—130<br>100 Cr<br>4000 Parez 613 | 6.3 | (no gel) | — |
| T624 | 4000 Flocon<br>4000 S—130<br>4000 Parez 613 | 7 | 24 hr | — |
| T625 | 4000 Flocon<br>4000 S—130<br>4000 Parez 613<br>200 Cr | 7 | 1 hr | — |
| T626 | 2000 Flocon<br>4000 S—130<br>4000 Parez 613<br>200 Cr | 7 | 1 hr | — |
| T628 | 2000 Flocon<br>3000 S—130<br>4000 Parez 613<br>100 Cr | 3.5 | 0.5 hr | — |
| T629 | 1000 Flocon<br>4000 S—130<br>4000 Parez 613<br>25 Cr | 7 | (no gel) | — |
| T630 | 2000 Flocon<br>3000 S—130<br>4000 Parez 613<br>100 Cr | 7 | (no gel) | — |
| T631 | 1000 Flocon<br>4000 S—130<br>4000 Parez 613<br>25 Cr | 3.5 | 2 hr | 75[1]<br>140<br>175 |
| T634 | 4000 Flocon | 3.5 | 1.5 hr | — |

TABLE II-continued

| | EXAMPLES OF SELECTIVE GELS | | | |
|---|---|---|---|---|
| Run | Composition (ppm Component) | pH | Preshear Gel Time | Reheal Temp °F. |
| | 4000 S—130<br>4000 Parez 613 | | | |
| T635 | 4000 Flocon<br>4000 S—130 | 3.5 | (no gel) | — |
| T638 | 4000 S—130<br>4000 Parez 613 | 3.5 | 3 hr | — |
| T639 | 600 Flocon<br>2000 S—130<br>4000 Parez 613 | 3.5 | 1.5 hr | — |
| T640 | 1000 Flocon<br>4000 S—130<br>4000 Parez 613 | 3.5 | 1.5 hr | 75<br>140<br>175 |
| T643 | 3000 Flocon<br>4000 Parez 613 | 3.5 | 1.5 hr | 75<br>140<br>175 |
| T646 | 5000 S—130<br>2000 Parez 613 | 3.5 | 4 hr | — |
| T647 | 5000 Flocon<br>2000 Parez 613 | 3.5 | 4 hr | — |
| T648 | 5000 S—130<br>1000 Parez 613 | 3.5 | 4 hr | — |
| T649 | 5000 S—130<br>1000 Parez 613<br>1000 resorcinol<br>1000 formaldehyde | 3.5 | 4 hr | — |
| T650 | 5000 aged V3140[2]<br>4000 Parez 613 | 3.5 | 24 hr | — |
| T652 | 5000 Flocon<br>1000 Parez 613 | 3.5 | (no gel) | — |
| T653 | 5000 S—130<br>1000 resorcinol<br>1800 formaldehyde | 3.5 | (no gel) | — |
| T654 | 5000 Flocon<br>1000 resorcinol<br>1800 formaldehyde | 3.5 | (no gel) | — |

[1]Entry in final column indicates first stage gel was sheared at room temperature and rehealed at indicated temperature.
[2]Hoechst V3140 in T650 was aged as 1% solution in deionized water in sealed vial for 5 days at 210 F.

Experiments to test the concept in the laboratory were done in two stages. In the first stage, polymer and cross-linker were mixed together. They were allowed to stand at room temperature. If a gel formed, then in the second stage the gel was sheared for 30 seconds in a Waring blender. It was then observed to determine whether, at various temperatures, the gel rehealed. In all of the experiments reported here, the shearing resulted in a fluid that poured easily, and gels that reformed.

The potential for these systems in high temperature waterflooding is demonstrated in the following example which mimics in the laboratory the field treatment steps. A sample containing Xanthan gum (2000 ppm, Pfizer Flocon 4800), He-B (5000 ppm, Phillips), phenol (1010 ppm), formaldehyde (1870 ppm, 37% solution), and $CrCl_3 \cdot 6H_2O$ (100 ppm) in synthetic sea water was mixed and its pH adjusted to 5.85 with sodium hydroxide (1N). This sample gelled in about 1–2 hours to form a stiff gel which looked like typical Xanthan/Cr gels. About 20 hours later, the gel, which looked unchanged, was sheared in a Waring Blender for 30 seconds to a non-viscous foam. This was charged into ampules and placed in a 210° F. oven. Twenty-two hours later (no gel after 5 hours) these had gelled to deformable but elastic gels which looked like typical HE-B/phenol/-formaldehyde gels.

Considerable latitude exists in the design of field processes employing polymeric slugs containing both selective and non-selective polymers. For example, to minimize any damage to the low permeability zones from the non-selective polymer during the initial stages of injection, the concentration of this component in the slug can be lowered until such time as the selective polymer has effectively isolated the low permeability zones from further invasion of fluid via filter cake formation. This is a preferred embodiment of the invention where the permeability contrast between zones is not large. In another example, a Xanthan/Cr gel can be used to selectively deliver a brine tolerant polyacrylamide (such as Phillips' HE-B or Hoechst's V3140 polymer) with organic cross-linker, e.g., phenol/formaldehyde, to the more permeable zones in hot reservoirs like the North Sea. Here, high temperature will degrade the Xanthan/Cr gel within a few days, but Phillips' HE-B will gel with phenol/formaldehyde to maintain reduced permeability at reservoir temperature and salinity.

Where it is desired to obtain increased sweep efficiency, gels of this invention can be used to plug a previously swept portion of a formation. Said gels can be directed to areas of increased permeability by utilization in any of the below methods.

One method where gels of this invention can be utilized is during a waterflooding process for the recovery of oil from a subterranean formation. After plugging the more permeable zones of a reservoir with the novel gels of this invention, a waterflooding process can be commenced. U.S. Pat. No. 4,479,894, issued to Chen et al., describes one such waterflooding process. This patent is hereby incorporated by reference in its entirety.

Steamflood processes which can be utilized when employing the gels described herein are detailed in U.S. Pat. Nos. 4,489,783 and 3,918,521 issued to Shu and Snavely, respectively. These patents are hereby incorporated by reference herein.

Gels described herein can also be used in conjunction with a cyclic carbon dioxide steam stimulation in a heavy oil recovery process to obtain greater sweep efficiency. Cyclic carbon dioxide steam stimulation can be commenced after plugging the more permeable zones of the reservoir with the novel gels of this invention. A suitable process is described in U.S. Pat. No. 4,565,249 which issued to Pebdani et al. This patent is hereby incorporated by reference in its entirety. Increased sweep efficiency can be obtained when the subject gels are used in combination with a carbon dioxide process by lowering the carbon dioxide minimum miscibility pressure ("MMP") and recovering oil. Prior to commencement of the carbon dioxide process, the more permeable zones are plugged with these novel gels. Carbon dioxide MMP in an oil recovery process is described in U.S. Pat. No. 4,513,821 issued to Shu which is hereby incorporated by reference.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for the sequential gellation profile control treatment of a formation having zones of varying permeabilities comprising:
   (a) making an aqueous gellable mixture containing components for a first stage gel in an amount sufficient to selectively enter pores in a formation's zone of greater permeability which gel forms ex-situ and is shear thinning;
   (b) placing into said aqueous mixture a second gellable mixture sufficient to form an in-situ gel comprised of:
      (i) 0.2 to 5.0 wt. percent of a cross-linkable polymer or mixtures of cross-linkable polymers having at least one functional group selected from a member of the group consisting of an amine, an amide, a hydroxyl, or a thiol group, and
      (ii) 0.02 to 50.0 wt. percent of a partially methylated aminoplast resin or an organic cross-linker and mixtures thereof which cross-link with said polymer so as to form a non-selective second stage gel in-situ;
   (c) allowing the aqueous mixture sufficient time for form ex-situ said first stage gel; and
   (d) injecting said first stage gel containing said second gellable mixture into said zone of greater permeability where said first stage gel selectively enters the zone of greater permeability, reheals and forms under formation conditions a solid gel having the characteristics of the in-situ gel which gel is substantially more resistant to formation conditions than said first stage gel.

2. The method as recited in claim 1 wherein said resin is selected from a member of the group consisting of melamine-formaldehyde, urea formaldehyde, ethylene urea formaldehyde, propylene urea formaldehyde, triazone, uron, glyoxal and mixtures thereof.

3. The method as recited in claim 1 where said polymer is a member selected from the group consisting of polyacrylamide, polyvinyl alcohol, poly (acrylamide-co-acrylamido-2-methyl-propanesulfonate), a terpolymer of 2-acrylamido-2-methyl-propane-3-sulphonic acid, acrylamide, and N-2-vinyl pyrrolidone, a copolymer of polyacrylamide cross-linked with methylene-bis-acrylamide, a terpolymer of 2-acrylamido-2-methyl-propane-3-sulphonic acid, vinylacylamide, and acrylamide acrylamide modified polyvinyl alcohol, and mixtures thereof.

4. The method as recited in claim 1 wherein the ratio of polymer to said resin required for gelation is from about 10:1 to about 1:10.

5. The method as recited in claim 1 where said non-selective gel forms a substantially rigid gel which undergoes substantially no syneresis and which can withstand formation temperatures up to about 230° F.

6. The method as recited in claim 1 where a water flood, a steam flood, or a carbon dioxide flood is directed into a zone of lesser permeability following step (c).

7. The method as recited in claim 1 where a polymerization retarder is placed into said aqueous solution so as to allow propagation to a desired distance into said more permeable formation zone.

8. The method as recited in claim 1 where said first stage gel comprises a Xanthan biopolymer in about 1,000 to about 5,000 ppm by weight, about 10 to about 1000 ppm of an alkali or alkaline earth metal hydroxide, about 30 to about 300 ppm of a transition metal which is contained in water having a salinity of from about 1.0 to about 30.0 wt. %.

9. The method as recited in claim 1 where said non-selective gel concentration in said aqueous mixture is lowered until such time as the first stage gel has substantially isolated said zone of higher permeability.

10. The method as recited in claim 1 where said organic cross-linker comprises formaldehyde, and phenol, resorcinol, and mixtures thereof.

11. The method as recited in claim 1 where said first stage gel comprises a Xanthan or an Alcaligenes biopolymer, a transition metal, an aminoplast resin and combinations thereof.

12. The method as recited in claim 1 where said first stage gel comprises a Xanthan or Alcaligenes biopolymer, a transition metal, an aminoplast resin and combinations thereof sufficient to form a gel at a pH of about 3.5 which gel reheals at a temperature up to about 175° F.

13. The method as recited in claim 1 where said first stage gel forms in about 1 to about 2 hours and said second stage gel forms in about 22 hours.

14. A method for the sequential gellation profile control treatment of a formation having zones of varying permeabilities comprising:
(a) making an aqueous gellable mixture containing components for a transition metal cross-linked Xanthan biopolymer first stage ex-situ gel in an amount sufficient to selectively enter pores in a formation's zone of greater permeability;
(b) placing into said aqueous mixture a second gellable mixture sufficient to form an in-situ gel comprised of;
  (i) about 0.2 to about 5.0 wt. percent of a cross-linkable polymer which is a member selected from the group consisting of polyacrylamide, polyvinyl alcohol, poly(acrylamide-co-acrylamido-2-methyl-propane-sulfonate), a copolymer of N-vinyl-2-pyrrolidone and acrylamide, a copolymer of polyacrylamide and methylene-bisacrylamide, a terpolymer of AMPS, vinylacylamide, and acrylamide, acrylamide modified polyvinyl alcohol and mixtures thereof having at least one functional group selected from a member of the group consisting of an amine, an amide, a hydroxyl, or a thiol group, and
  (ii) 0.02 to 50.0 wt. percent of a partially methylated aminoplast resin or an organic cross-linker and mixtures thereof which cross-link with said polymer in-situ thereby forming a non-selective second stage gel;
(c) allowing the aqueous mixture sufficient time to form ex-situ said first stage gel; and
(d) injecting said first stage gel containing said second gellable mixture into said zone of greater permeability where said first stage gel selectively enters the zone of greater permeability, reheals and forms under formation conditions a solid gel having the characteristics of the in-situ gel which gel is substantially more resistant to formation conditions than said first stage gel.

15. The method as recited in claim 14 wherein said resin is selected from a member of the group consisting of melamine-formaldehyde, urea formaldehyde, ethylene urea formaldehyde, propylene urea formaldehyde, triazone, uron, and glyoxal, and mixtures thereof.

16. The method as recited in claim 14 wherein the ratio of polymer to said resin required for gelation is from about 10:1 to about 1:10.

17. The method as recited in claim 14 where said non-selective gel forms a substantially rigid gel which undergoes substantially no syneresis and which can withstand formation temperatures up to about 230° F.

18. The method as recited in claim 14 where a water flood, a steam flood, or a carbon dioxide flood is directed into a zone of lesser permeability following step (c).

19. The method as recited in claim 14 where a polymerization retarder is placed into said aqueous solution so as to allow propagation to a desired distance into said more permeable formation zone.

20. The method as recited in claim 14 where said first gel comprises a Xanthan biopolymer in about 1,000 to about 5,000 ppm by weight, about 10 to about 1,000 ppm of an alkali or alkaline earth metal hydroxide, about 30 to about 300 ppm of a transition metal which is contained in water having a salinity of from about 1.0 to about 30.0 wt.%.

21. The method as recited in claim 14 where said non-selective gel concentration in said aqueous mixture is lowered until such time as the first stage gel has substantially isolated said zone of higher permeability.

22. The method as recited in claim 14 where said organic cross-linker comprises formaldehyde, and phenol, resorcinol, and mixtures thereof.

23. The method as recited in claim 14 where said first stage gel forms in about 1 to about 2 hours and said second stage gel forms in about 22 hours.

* * * * *

UNITED STATES PATENT AND TRADEMARK OFFICE
CERTIFICATE OF CORRECTION

PATENT NO. : 4,901,795
DATED : February 20, 1990
INVENTOR(S) : Phelps et al.

It is certified that error appears in the above-identified patent and that said Letters Patent is hereby corrected as shown below:

Title page, line [22], should read -- Filed: Dec. 15, 1988 --

Col. 3, line 51, "A low pH," should read -- At low pH --

Col. 6, line 8, "AMPSR-AMPVA$^3$ 10%" should be -- AMPS$^{®}$-AMPVA$^3$ 10% --

Col. 10, line 14, "for" should be -- to --

Col. 10, lines 37-38, Insert a comma between "acrylamide" and "acrylamide"

Signed and Sealed this

Fifth Day of May, 1992

Attest:

DOUGLAS B. COMER

*Attesting Officer*   *Acting Commissioner of Patents and Trademarks*